Nov. 14, 1961

R. W. LANDEE 3,009,144

SYSTEM AND SUBCOMPONENTS FOR SELECTING AND CONTROLLING
SURVEILLANCE AND PRECISION DISPLAYS FOR
GROUND-CONTROLLED APPROACH

Filed March 31, 1955

ROBERT WAYNE LANDEE
INVENTOR.

BY
Edmund J Kendrick

ATTORNEY

FIG. 4.

United States Patent Office 3,009,144
Patented Nov. 14, 1961

3,009,144
SYSTEM AND SUBCOMPONENTS FOR SELECTING AND CONTROLLING SURVEILLANCE AND PRECISION DISPLAYS FOR GROUND-CONTROLLED APPROACH
Robert Wayne Landee, Encino, Calif., assignor to Gilfillan Bros. Inc., Los Angeles, Calif., a corporation of California
Filed Mar. 31, 1955, Ser. No. 498,237
12 Claims. (Cl. 343—11)

This invention relates to a selectively operable indicating device which may provide either polar, rectilinear, or mixed polar-rectilinear visual displays of target information detected in a radar scanning system and, more particularly, to a system, and associated subcomponents for selecting and controlling surveillance and precision displays for ground-controlled approach, where the surveillance display is in the form of a plan position-indicator (P.P.I.) display, and the precision display is in the form of a combined elevation and azimuth (AZ—EL) display at least partially in rectilinear coordinates.

The present invention may find general application in any situation where a display device, such as a cathode ray tube, is to be utilized to provide a plurality of visual indications of target information based upon different coordinates, such as polar coordinates, rectilinear coordinates, or various combinations thereof. In particular the invention is useful in a system of the type described in copending U.S. patent appln. Serial No. 511,456 for "Simplified Ground-Controlled Approach System Including Adaptations for Surveillance, Precision Approach, Taxi, and Height Finding" by Landee et al. filed May 27, 1955, now U.S. Patent No. 2,975,413, issued March 14, 1961; where both surveillance and precision displays are required.

Although the invention is not so limited, the surveillance or search display of this copending application is a P.P.I. representation of the scanning field of the azimuth antenna which is rotated through 360° in search of targets or aircraft seeking guidance in landing approach.

After an aircraft seeking approach guidance is located in search and has been directed to the area within a predetermined precision angle encompassing an available landing strip, the operator of the system of the copending application switches to the precision approach operation. During precision approach the target information is made available separately in azimuth and elevation in certain predetermined precision angle ranges such as 30° in azimuth and 7° in elevation.

The combined precision azimuth and elevation display is referred to in this and other copending applications as an AZ—EL display and may be in rectilinear coordinates of range and angle in the form of a B display or in a combination of rectilinear and polar coordinates as in the arrangement of Patent No. 2,649,581 for "Single Scope Two-Coordinate Radar System" by H. G. Tasker et al. issued August 18, 1953.

In conventional practice the search or P.P.I. display and the precision displays (they were not combined prior to the invention of Tasker et al. above) have had separate existences and therefore have required separate structure and resulted in a considerable duplication in circuits. Thus, in a typical GCA installation conventional practice formerly required separate and complete facilities for P.P.I. searching and display and independent facilities for the precision displays, although both displays may not be utilized simultaneously and only a single operator may monitor both operations.

The conventional arrangement is especially inefficient where small airport facilities are concerned and economy in equipment is of the essence. Furthermore, the fact that typically a single target or aircraft is to be located in search and then directed for precision approach makes the conventional arrangement both unnecessarily complicated and difficult to operate since a single operator may have to view two or three displays and be concerned with a multitude of disassociated control operations.

The present invention obviates these and other disadvantages inherent in the prior art in providing an indicator device where the same deflection circuit and antenna position indicating means may be utilized to provide displays representing either search or precision scanning.

According to one subcombinational aspect of the invention, a rotatable deflection element, which may be a magnetic yoke for a cathode ray tube, is controlled through a servo circuit receiving certain synchro vector signals. During surveillance or search the synchro vector signals are made to rotate in synchronism with the P.P.I. scanning of the antenna (azimuth) and then, in response to the selection control of the operator, the same synchro signal is positioned through a simple switching arrangement, in a direction corresponding to one of the coordinates of the precision display; resulting in a corresponding positioning of the rotatable deflection element. In a typical application the fixed vector position corresponds to the horizontal range vector position of a B display.

In this manner the rotatable deflection element functions both in search and precision operations. In the precision phase, then, the second coordinate is represented by introducing electronic deflection controls such as in the arrangement of H. G. Tasker et al. above.

In addition the invention provides means in the form of a fixed deflection element which is utilized in an efficient manner for both search and precision purposes. The fixed deflection element is utilized as an off-center control device during search operations and provides perpendicular deflection control signals allowing the positioning of a P.P.I. display so as to accentuate certain areas. The same element then is utilized in precision operation to allow the introduction of the electronically controlled second coordinate, which may appear in the form of an AZ—EL angle signal applied to one winding on the element. The fixed element also allows offsetting in the direction of the first coordinate alone, where the first coordinate is specified by the fixed synchro signal vector or the fixed position of the rotatable deflection element during precision operation.

Since precision signals in the second coordinate are generally slowly varying signals corresponding to the movement of the azimuth and elevation antennas, the fixed deflection element may include a high permeability magnetic core and therefore requires a minimum of driving current to provide the desired operation. This arrangement is also preferred for the offcentering controls.

In its general system aspect the invention provides an efficient means whereby search and precision control signals may be readily interchanged, at the operator's option, through a simple switching arrangement. Considered in its entirety this switching arrangement provides the following functions:

(1) A selection between rotation indicating signals which may correspond to a P.P.I. position in surveillance, and a fixed synchro excitation signal which may correspond to one of the coordinate directions in precision scanning.

(2) A switching operation at the receiver location which presents a fixed synchro excitation signal for remoting to the transmitter synchro section during surveillance operation and for presenting positional data signals received from the transmitting location to a decoder at the receiver during precision operation.

(3) A switching selection at the receiver location for applying surveillance and precision sweep length control signals to a yoke or range deflection circuit.

(4) A switching operation for selection between surveillance centering signals applied to the fixed deflection circuit and a variable coordinate signal such as an AZ—EL angle signal during precision scanning.

(5) A switching operation at the transmitting location for presenting the signals of the transmitter signal section for remoting during surveillance, to constitute the rotation indicating signals; and for presenting to the transmitter synchro section suitable signals for positional data modulation providing signals representing the intermittent fractional rotational movement of the scanning devices, during precision operations.

The circuits for encoding and decoding the azimuth and elevation positions during precision operation form no part of the present invention and are described and claimed in copending U.S. patent application Serial No. 488,795 for "Periodic Reference Signal Modulation Method and Apparatus for Representing the Position of a Device," by T. J. Johnson, Jr., filed February 17, 1955, now U.S. Patent No. 2,976,521. The method of this copending application readily lends itself to the efficient switching arrangement of the present invention since a fixed synchro vector for the encoding modulation in accordance with the method of the copending application may be provided through an arrangement which is similar to the switching arrangement at the indicator end for providing a fixed vector for positioning of the rotatable deflection element.

The precision encoding and decoding method of T. J. Johnson is also preferred for utilization with the selectable search and precision positioning arrangement of the present invention due to the fact that the same remoting lines may be utilized in a two-way operation. During search or precision scanning the remoting lines carry the rotation-indicating signals, in a conventional synchro manner, and are then utilized during precision scanning to carry the encoded angle-representing signals in accordance with the method described in the application by T. J. Johnson. It may be noted, however, that separate remoting lines are utilized in the system of the above-mentioned copending U.S. patent application by Landee et al. for transmitting rotation-indicating signals and for transmitting encoded positional data signals representing precision angle information. In the detailed description which follows the simplicity of a single set of remoting lines is illustrated, but it will be understood that the invention herein may be employed as well in the system of the copending application.

Accordingly, it is an object of the present invention to provide a selectively operable indicating device which may provide either polar rectilinear or mixed polar-rectilinear displays of target information without the necessity of a duplication of circuits therefor.

Another object is to provide a switching arrangement which may be utilized in a system where surveillance and precision scanning is to be performed, the switching arrangement making it possible to control the operation of an indicating device to provide either surveillance or precision displays.

A further object of the invention is to provide a device for controlling the utilization of a rotatable deflection element in an indicator system where the element is to be positioned in accordance with received rotation-indicating signals, during searching operations, and then is to be positioned in a fixed direction corresponding to one coordinate in a precision display.

Yet another object is to provide an indicator circuit which may be utilized in a ground controlled approach radar system where elevation and azimuth scanning antennas are employed to provide a polar or P.P.I. surveillance display and a precision display without the necessity of a duplication of circuits.

Still another object of the invention is to provide a simple dual-purpose deflection circuit which may be utilized, upon selection, to provide range deflecting signals in a polar display or range deflection signals in a fixed coordinate direction.

An additional object of the invention is to provide an efficient circuit arrangement which may be utilized for displaying surveillance and precision information resulting in an economy which is necessary for small airport facilities.

A more specific object of the invention is to provide a switching arrangement which may be utilized in a ground-controlled approach radar system including an azimuth and an elevation antenna to present azimuth antenna rotation-indicating signals to a received synchro or a fixed synchro excitation signal in response to an operator's control, thereby allowing an efficient utilization of the same deflection circuit.

Another specific object of the invention is to provide a selectively operable device which may be utilized to control the operation of a deflection circuit including a magnetic yoke adapted to receive range sweep signals at a relatively high frequency, the device including means controlling the position of the yoke in accordance with received position-indicating signals and being selectively operable to fix the position of the yoke in a predetermined coordinate direction in accordance with a synchro excitation signal.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figure 1:
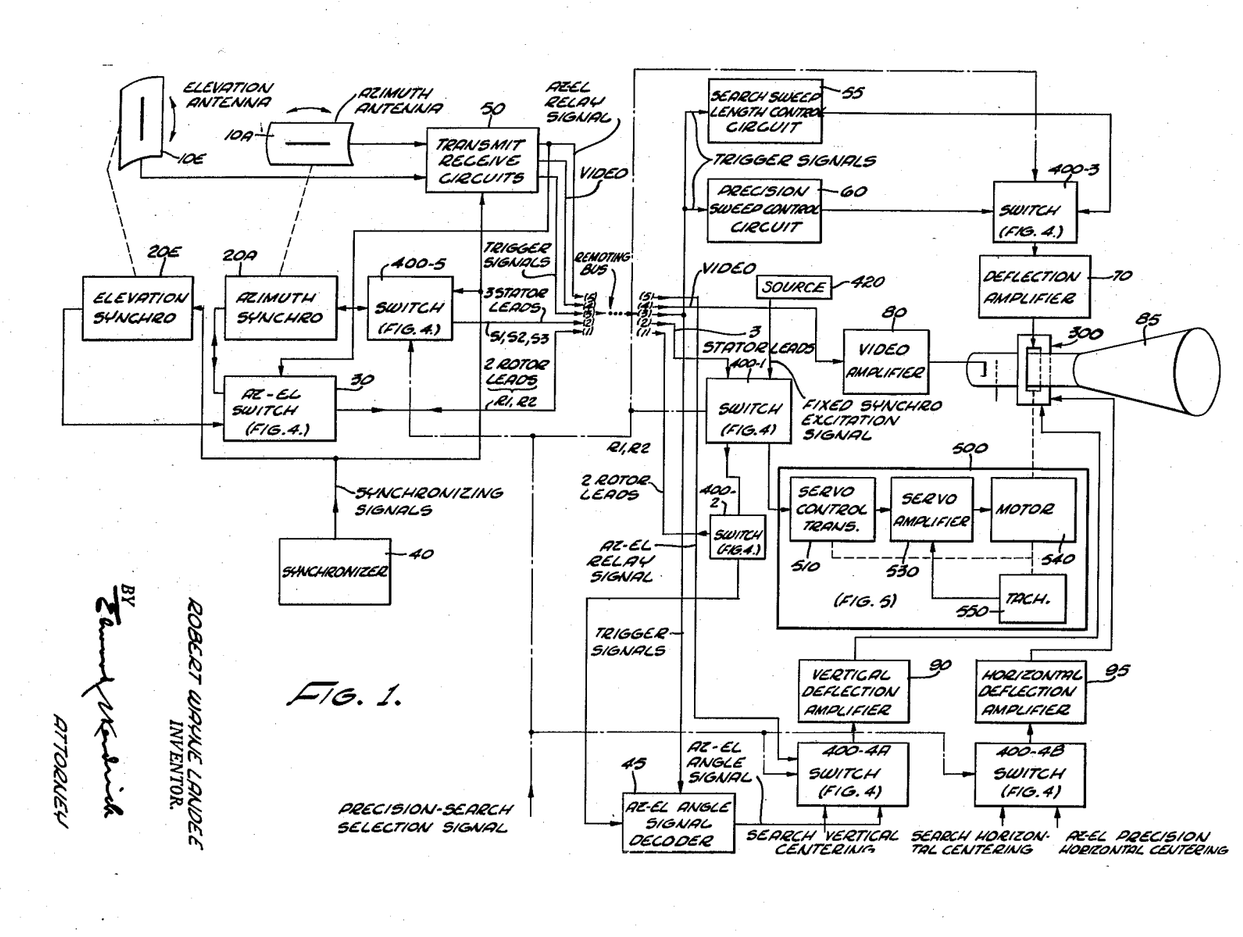
FIG. 1 is a block diagram illustrating a typical system arrangement where the present invention may be employed.

Reference is now made to FIG. 1 wherein the general form of a system for controlling surveillance and precision displays for ground controlled approach, in accordance with the present invention, is shown in block diagram form.

Figure 3:
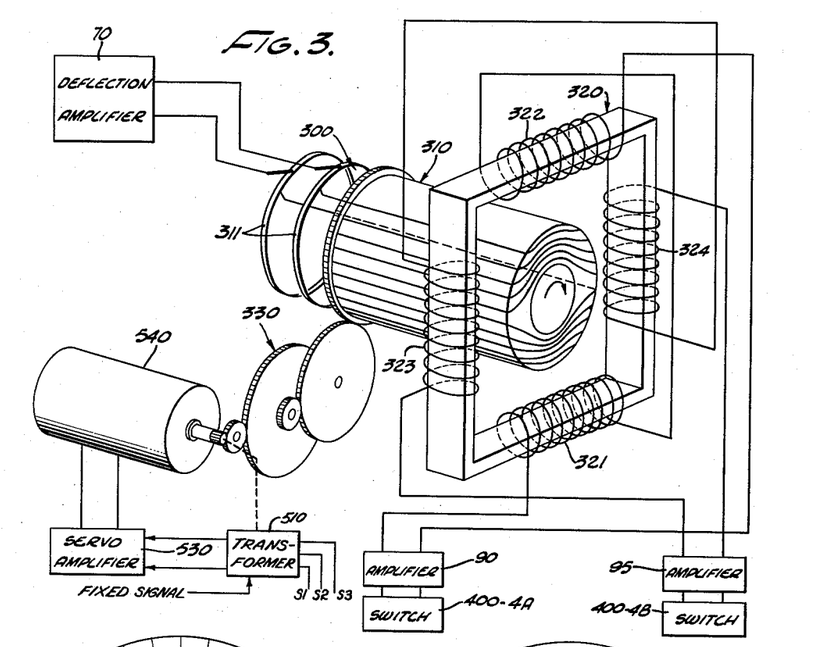
FIG. 3 is a perspective showing of the rotatable and fixed deflection elements which may be utilized in practicing the invention.

In general the arrangement of FIG. 1 is designed to illustrate a typical system situation where the various component aspects of the present invention may be employed. A reference number designation is employed where components which do not form part of the present improvement are given two decimal digit numbers, such as 10, 20, etc., and important components utilized in the indicator device or switching arrangement of the present invention are given reference numbers with three digits such as 300, 400, etc. The components referenced with the three digit numbers are then shown in specific illustrative detail in figures having the same reference as the first digit of the component number. Thus FIGURE 3 shows a suitable specific arrangement for the rotatable and fixed deflection elements 300 which may be utilized in practicing the invention.

As indicated in FIG. 1, the invention may be employed in an arrangement where the ground approach of an aircraft is controlled in accordance with radar information detected through the scanning operation of elevation and azimuth antennas 10E and 10A respectively. It will be understood, of course, that the description of the invention in this particular background setting is not intended by any means to be a limitation but rather a convenient mode of pointing out a typical application thereof.

The elevation and azimuth antennas are mechanically coupled to the rotor sections of elevation and azimuth synchros 20E and 20A respectively. The rotors of synchros 20 are electrically connected to an AZ—EL switch 30, where the term AZ—EL indicates a mixed azimuth and elevation function throughout this specification. Switch 30 then provides composite angle positional data signals as the modulation component of a reference signal applied to the stators of synchros 20, the reference signal being provided by a synchronizer circuit 40. The manner in which these positional data signals are provided is fully explained in the above-mentioned copending application by Thomas J. Johnson, Jr. These positional data signals which represent the instantaneous angular scan position of the respective antennas are presented for remoting to a remoting bus (1) including two rotor leads R1 and R2.

While the stator of elevation synchro 20E always receives synchronizer reference signals produced by circuit 40, the azimuth synchro is utilized in a two-way operation. During the searching or surveillance phase when azimuth antenna 10A is rotated through a 360° cycle, the stator of synchro 20A is coupled through a switch section 400—5 to a remoting bus (2) including leads S1, S2 and S3, which then carry rotation indicating signals; and the rotor of azimuth synchro 20A at this time receives a fixed synchro reference signal via bus (1) and through AZ—EL switch 30, which then remains fixed in an azimuth position. During precision scanning, however, the stator of azimuth synchro 20A receives the synchronizing signals produced by synchronizer 40 through switch 400—5 and then is operative to produce the positional data signals through its rotor in the same manner as these signals are derived through elevation synchro 20E. The switching operation of switch 400—5 is controlled in accordance with a precision-search selection signal which is utilized to actuate all of switches 400, as is more specifically considered with reference to FIG. 4 below.

Certain other signals which may exist in the system of utilization are indicated as being produced by transmit-receive circuits 50 which are assumed to include any of the necessary circuits required for the particular scanning operation. These circuits are not described in detail here since they form no part of the present invention and may be assumed to be conventional for present purposes.

It is helpful in this discussion, however, to assume that transmit-receive circuits 50 provide an AZ—EL relay signal indicating the respective phases of azimuth (AZ) and elevation (EL) scanning; composite video signals corresponding to target information received through the scanning antennas; and trigger signals although the trigger and video signals may be mixed for remoting as in the above-mentioned system by Landee et al. It is assumed for present purposes that they are remoted via separate leads. The trigger signals, video signals, and AZ—EL relay signal are indicated as being transmitted through buses (3), (4) and (5), respectively, to the receiving location.

At the receiving location bus (1) carrying rotor leads R1 and R2 receives a fixed synchro excitation signal produced by a source 420 and passed through a switch section 400—1 during the search or surveillance phase of operation. At this time, AZ—EL switch 30 remains in the azimuth position and azimuth synchro 20A is operative to then provide conventional synchro signals indicating the rotation of antenna 10A. These signals are routed through switch 400—5 to bus (2). Bus (2) bearing the stator leads S1, S2, and S3 is applied through switch 400—1, at the receiving location, to the input circuit of servo control device 500, which is associated with deflection elements 300.

When the precision-search selection signal indicates that precision scanning is to be performed, bus (1) then is routed through a switch 400—2 to a decoder 45. During this phase of operation then the rotor leads R1 and R2 bear positional data signals indicating the angular position of antennas 10E and 10A and these signals are decoded through circuit 45 to provide the AZ—EL angle signal which is utilized to control a composite azimuth and elevation display in the manner fully described in U.S. Patent No. 2,649,581 by Tasker et al. for "Single Scope Two Coordinate Radar System" issued August 18, 1953.

During the precision searching phase bus (2) is no longer utilized to carry rotation indicating signals and instead the fixed synchro excitation signal produced by source 420 is applied through switch 400—1 to servo control circuit 500. Switch 400—1 is arranged according to the present invention to present this fixed synchro signal in a vector direction which controls the positioning of the rotatable deflection element in device 300 to a predetermined fixed coordinate direction as will be more fully explained below.

Servo control circuit 500 therefore drives the rotatable deflection elements in device 300 to position this element in accordance with received signals which are either rotation indicating signals passed through leads S1, S2 and S3 for the searching operation or the fixed coordinate position signal derived through switch 400—1 during precision scanning operations.

The trigger signals passed through bus (3) actuate search and precision sweep length control circuits 55 and 60, respectively, which are coupled to a switch section 400—3 also receiving the precision-search selection signal. The output signal derived through switch 400—3 is applied to deflection amplifier 70 which may be considered to be a yoke or range deflection amplifier in a particular utilization. Amplifier 70 provides relatively high frequency deflection signals for actuating the rotatable deflection element within device 300.

The video signals are passed through bus (4) to a video amplifier 80 at the receiving location which is illustrated in a typical situation to drive the cathode of cathode ray tube indicator device 85 although this is not an essential arrangement.

The range sweeps of cathode ray tube 85 are controlled through deflection amplifier 70 which drives the rotatable element of device 300 and the centering of the polar display provided during surveillance operation is controlled by vertical and horizontal amplifiers 90 and 95 respectively, driving the fixed deflection element in device 300 in corresponding directions.

During surveillance amplifiers 90 and 95 receive vertical and horizontal centering signals through associated switches 400-4A and 400-4B. When precision operation begins, then switch 400-4A receives the AZ—EL angle signal derived through decoder 45 which then controls the vertical deflection of the cathode ray tube beam through the fixed deflection element of device 300. At the same time an AZ—EL precision horizontal centering signal is passed through switch 400-4B and controls the horizontal offsetting of the precision display.

Figure 2:
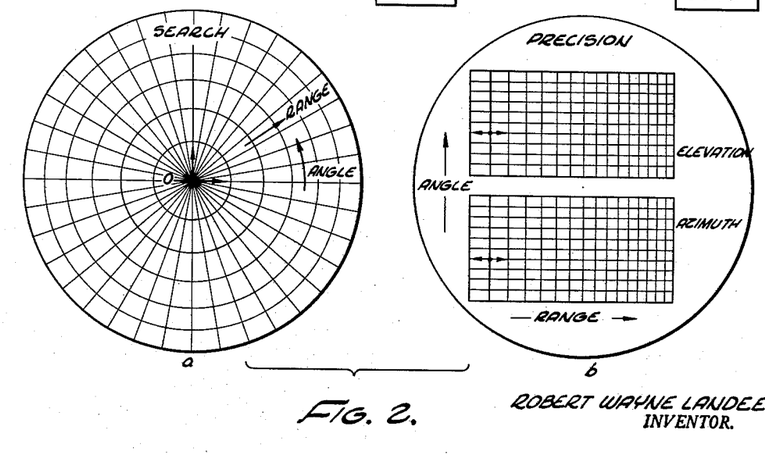
FIG. 2 consists of two display diagrams illustrating a typical utilization of the invention for providing polar and rectilinear displays on the same device.

The general operation of the invention may be described by concurrently referring to FIGS. 1, 2 and 3 and considering a typical application where the same display device, such as cathode ray tube 85, is to be selectively actuated to provide either a P.P.I. display of target information or a combined azimuth-elevation "B" display for precision scanning, a "B" display being a rectilinear display where the range coordinate remains fixed along one axis and the angle coordinate is linearly variable along a second coordinate perpendicular to the first. The P.P.I. and precision "B" display are shown in FIGS. 2a and 2b respectively.

Referring now specifically to FIG. 3, it will be noted that device 300 includes a rotatable element or yoke 310 which may be assumed to be arranged in a conventional manner to provide a magnetic flux vector which passes through the neck of cathode ray tube 85. The rotatable element 310 is coaxial with a fixed deflection element 320 which receives the various vertical and horizontal centering and offsetting signals as will be further described below. Rotatable element 310 receives suitable deflection signals through amplifier 70, these signals typically being range sweep signals which may be generated in a conventional manner. These deflection signals are applied to the windings of yoke 310 through an appropriate slip ring arrangement 311.

Rotatable element 310 is driven through appropriate gear arrangement 330 mechanically coupling element 310 to a driving motor 540 forming part of servo control circuit 500. Motor 540 is positioned in accordance with signals received by servo amplifier 530 also forming part of control circuit 500.

Servo amplifier 530 receives its signals through transformer 510 having its output winding mechanically coupled to motor 540 through appropriate gears in gear arrangement 330. Transformer 510, it will be noted, receives a fixed signal employed for positioning in the precision operation and rotation signals S1, S2 and S3 which are employed during the surveillance operation.

During the surveillance operation then a synchro excitation signal passes through switch 400—1 down remoting bus (1) to AZ—EL switch 30 and thence to the rotor of azimuth synchro 20A mechanically connected to azimuth antenna 10A. Azimuth antenna 10A is rotated through a 360° scanning cycle in order to locate possible targets for ground controlled approach. During this rotation azimuth synchro 20A then produces rotation indicating signals which pass through switch 400—5 and bus (2) and are thence received by servo control circuit 500 through switch 400—1. Thus in this manner the azimuth rotation operation during surveillance results in a corresponding rotation of motor 540 and driving element 310.

As element 310 rotates and varies the vector of range deflection, the display which appears on cathode ray tube 85 assumes a conventional P.P.I. presentation where the range vector is a polar coordinate which appears to originate from an origin point "0" as shown in FIG. 2. The origin point "0" may be offset in accordance with vertical and horizontal centering signals received through switches 400–4A and 400–4B actuating amplifiers 90 and 95. As further indicated in FIG. 3 amplifiers 90 and 95 drive coil windings on element 320 in a manner providing flux vectors which will result in the desired beam deflection. Thus in particular amplifier 90 drives coils 321 and 322 connected in series opposition resulting in a flux vector which is horizontal so that the beam of tube 85 is deflected thereby in a vertical direction, in a well known manner. In a similar manner amplifier 95 drives coils 323 and 324 connected in series opposition providing a vertical flux vector with a resulting horizontal deflection effect.

Thus during surveillance operation amplifiers 90 and 95 provide an off-centering control which positions the origin of the P.P.I. display shown in FIG. 2a in accordance with control signals which pass through switches 400-4A and 400-4B.

When the precision selection is made and switches 400 are actuated to a corresponding state, the fixed synchro excitation signal at the receiving location then is presented to servo control circuit 500 in a manner resulting in a positioning of element 310 in a predetermined coordinate direction which typically may provide range sweep signals in a horizontal coordinate direction for a "B" display as shown in FIG. 2b. At the same time the operation of azimuth synchro 20A is changed through the action of switch 400—5 so that its stator then receives synchronizing signals produced by circuit 40. Thus both the elevation and azimuth synchros provide positional data indicating the fractional and intermittent motion of antennas 10. These signals are combined through AZ—EL switch 30, which is then also actuated in accordance with the AZ—EL relay signal received from circuits 50. The combined signals then appear on rotor leads R1 and R2 and are transmitted by a bus (1) to switch 400—2. These composite data signals then are decoded through circuit 45 providing the AZ—EL angle signal.

Since switch 400-4A has been actuated in accordance with the precision search selection signal, the vertical centering signal is no longer applied but instead the AZ—EL angle signal is utilized to actuate amplifier 90 with the result that the vertical off-centering coils 321 and 322 now have a different function.

At the same time switch 400-4B is operative to pass the AZ–EL horizontal centering signal to amplifier 95. Thus during the precision operation display device 85 receives slowly varying vertical deflection signals in accordance with the AZ—EL angle signal produced by decoder 45 resulting in the coordinate variation in angle indicated in FIG. 2b. Rotatable element 310 is positioned by the fixed synchro excitation signal in the other predetermined coordinate direction which is assumed to represent range.

At the same time the other switching functions are being performed, switch 400—3 is actuated to select between search and precision sweep length control circuits 55 and 60. Thus deflection amplifier 70 receives a range gating signal having a time duration corresponding to the duration desired for the particular display.

In this manner then the invention effectively provides a dual purpose display control device which typically may be utilized to actuate a display device such as cathode ray tube 85 to provide either a polar display as indicated in FIG. 2a or a rectilinear display such as appears in FIG. 2b. As a result many of the circuits which are utilized to control the PPI display operation need not be duplicated, as has previously been conventional practice.

Figure 4:
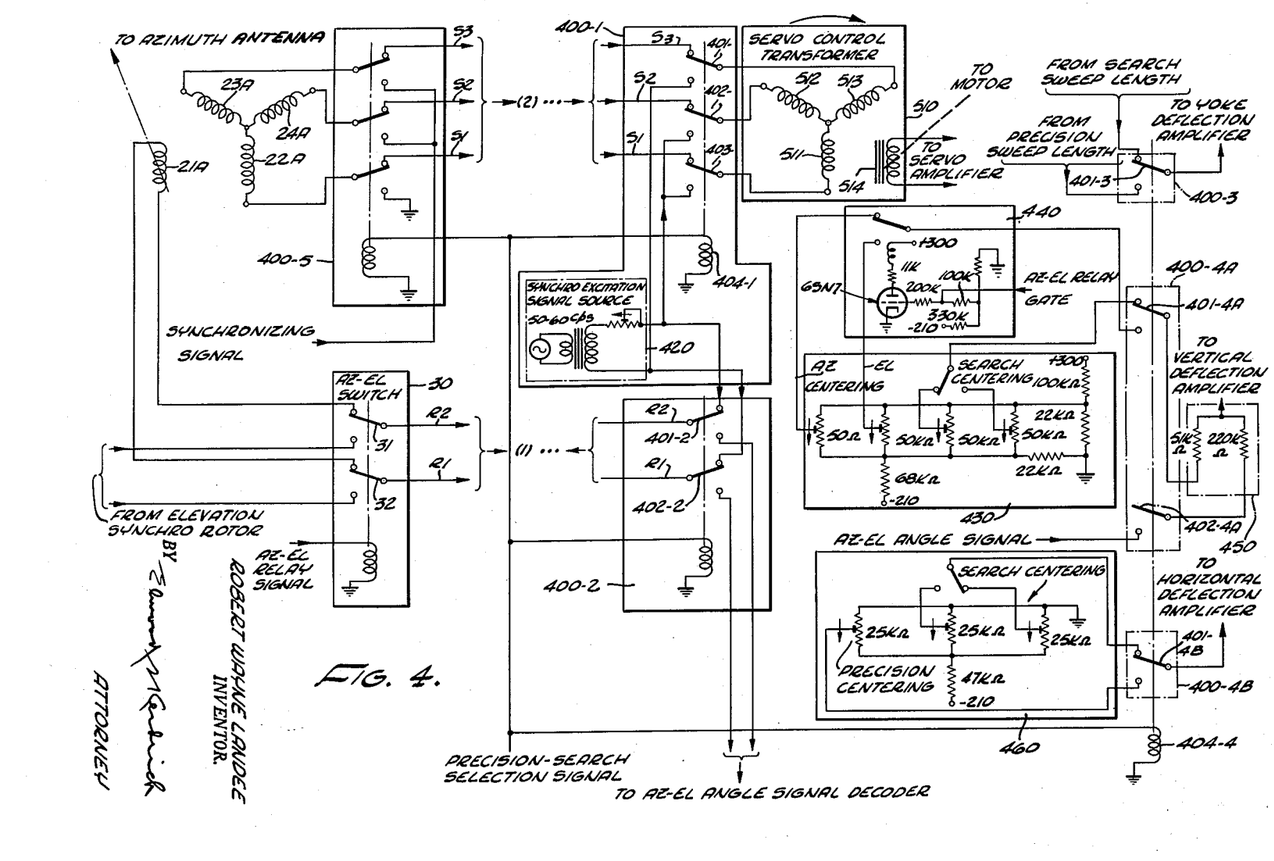
FIG. 4 is a schematic diagram of switching circuits which may be utilized in an arrangement of the present invention.

While the present invention is not so limited, the understanding thereof is aided through the consideration of a specific switching arrangement as shown in FIG. 4. It should be understood, however, that while electro-mechanical switches are shown, electronic switches may be utilized as well and that the particular arrangement where certain switching functions are associated with a common controlling solenoid is by no means essential to the invention. Reference being made to FIG. 4, it may be noted therein that switch 400—1 is shown as including three transfer circuits 401—1, 402—1, and 403—1, which normally receive signals via bus (2) including the leads S1, S2 and S3. These transfer contacts are actuated by means of a solenoid 404—1, which receives the precision-search selection signal which may conveniently be a 28 volt signal which is present during precision operations, and absent for searching operations.

In their unactuated positions then, the transfer contacts of circuit 400—1 present the signals on leads S1, S2 and S3 to respective input windings 511, 512 and 513 of servo control transformer 510, forming part of servo control circuit 500 shown in FIG. 1. The rotatable output winding 514 of servo control transformer 510 is connected to servo amplifier 530 shown in more particular detail in FIG. 5 herein.

Thus when solenoid 400—1 is unactuated, corresponding to the searching or surveillance phase of operation, conventional synchro signals transmitted via leads S1, S2 and S3 are presented to servo amplifier 530 through transformer 510 and servo control circuit 500 then functions to rotate element 310 and winding 514 in direct synchronism with the rotation of azimuth antenna 10A.

When the precision operation begins and a corresponding signal is applied to solenoid 404—1, the associated contacts are transferred and then transformer 510 receives a synchro excitation signal produced by a source 420, in a manner which effectively presents a fixed synchro vector signal to transformer 510. The effect of a fixed vector signal is achieved by applying one output potential of source 420 to windings 511 and 512 of transformer 510, and the second or reference potential (which may be ground) to the third winding 513. Furthermore, transformer 510 is selected to be a conventional three phase servo transformer so that the connecting of two windings which are 120° out of space phase results in a flux vector signal in the same coordinate as the third winding.

In this manner the actuation of contacts 401—1, 402—1 and 403—1 to the corresponding transferred states results in a fixed vector signal being presented to servo amplifier 530, with the result that yoke or rotatable element 310 is positioned in a fixed direction. This direction may be predetermined by properly orienting the angular position of transformer 510. It is for this purpose that the arrow is shown around transformer 510 in FIG. 4 to indicate that the transformer mounting may be adjustable in rotation to allow the setting thereof so that rotor 540 will properly position element 310. A similar adjustment may be made in azimuth synchro 20A to ensure the proper positional correspondence between the azimuth antenna and element 310 during surveillance operation.

Thus in this manner a simple switching arrangement allows the control of a rotatable element 510 through the same servo control circuit 500, in two basic types of operation. In the first operation element 310 is rotated in synchronism with azimuth antenna 10A (or any other rotatable device) and in the other operation the contacts of switch 400—1 are transferred and a fixed synchro excitation signal is presented to transformer 510. In theory the flux vector direction specified by the orientation of transformer 510 and the connecting of two windings 511 and 512 to the same potential of source 420 should be 90° out of space phase with the desired fixed coordinate direction. In this position the signal presented to servo amplifier 530 becomes zero because there is no flux linkage with windings 511, 512 and 513. However, the important thing to note is simply that the housing of transformer 510 should be made adjustable so that element 310 may be positioned in the desired predetermined direction after solenoid 404—1 is actuated.

Switch 400—2 may be considered to be a double-pole, double-throw switch having two transfer contacts 401—2 and 402—2. In their unactuated position these contacts present the synchro excitation source 420 for remoting by bus (1) to AZ—EL switch 30. Switch 30 is controlled by an applied AZ—EL relay signal which may be defined to be zero or absent during the searching operation so that switch 30 remains in the azimuth position. As a result the fixed excitation signal provided by source 420 is applied through contacts 401—2 and 402—2 and 31 and 32 in switch 30, to the rotor 21A of azimuth synchro 20A. When circuits 401—2 and 402—2 are transferred, signals are remoted in the opposite direction through bus (1) bearing positional data signals indicating the fractional and intermittent movement of both the azimuth and elevation antennas. These signals are then transmitted via separate leads to the AZ—EL angle signal decoder 45.

Switches 400—3, 400—4A and 400—4B are shown by way of illustrative example as being controlled by a single solenoid 404—4. This arrangement is different from that indicated in FIG. 1 and thus points out the fact that a considerable number of different switching arrangements is possible since the precision-search signal may be utilized to effect the desired transfer operation in any convenient manner where the various transfer contacts are associated as desired. Switch 400—3 includes a single transfer contact 401—3 which normally receives a signal from circuit 55 specifying the search sweep length and when transferred receives a signal from circuit 60 specifying the precision sweep length.

Switch 400—4A is a double-pole, double-throw switch including transfer contacts 401—4A and 402—4A. Contact 401—4A normally receives vertical centering or offcentering signals produced by a source 430, and when transferred receives azimuth and elevation vertical offsetting signals which are required for the precision operation. It will be noted that these signals are provided by source 430 and are combined through an AZ—EL switching circuit 440 in response to a received AZ—EL relay gate. The manner and purpose of the AZ—EL switching operation are more fully described in the above-mentioned patent by Tasker et al.

Transfer contact 402—4A normally receives no signal and when transferred receives the AZ—EL angle signal which is required for the precision operation. The AZ—EL angle signal is combined with the offsetting signals derived through circuit 401—4A in a resistor adder circuit 450 providing a composite vertical deflection control signal which then actuates amplifier 90.

Finally transfer contact 401—4B normally receives centering or offcentering signals from a source 460 and when transferred receives AZ—EL precision horizontal centering signals produced by this source.

Switch 400—5 in many respects may be considered to be similar to 400—1. In its unactuated position this switch connects the three stator windings 22A, 23A and 24A of synchro 20A to corresponding leads S1, S2 and S3 for remoting by a bus (2) to the windings of transformer 510. This connection is quite conventional and provides rotation-indicating signals corresponding to the position of azimuth antenna 10A.

When the contacts of switching circuit 400—5 are transferred, windings 23A and 24A are connected together and receive the synchronizing signals produced by circuit 40 and winding 22A is connected to a reference potential which may be ground. As is more fully explained in the above-mentioned copending application by T. J. Johnson, Jr., the operation of synchro 20A in this manner provides a modulated periodic reference signal which represents the instantaneous position of antenna 10A. This signal is obtained through rotor 21A and is combined with a similar signal derived through elevation synchro 20E in AZ—EL switch 30. A composite angle data signal then is presented for remoting via bus (1) and is then passed through transfer contacts 401—2 and 402—2 to decoder 45.

Figure 5:
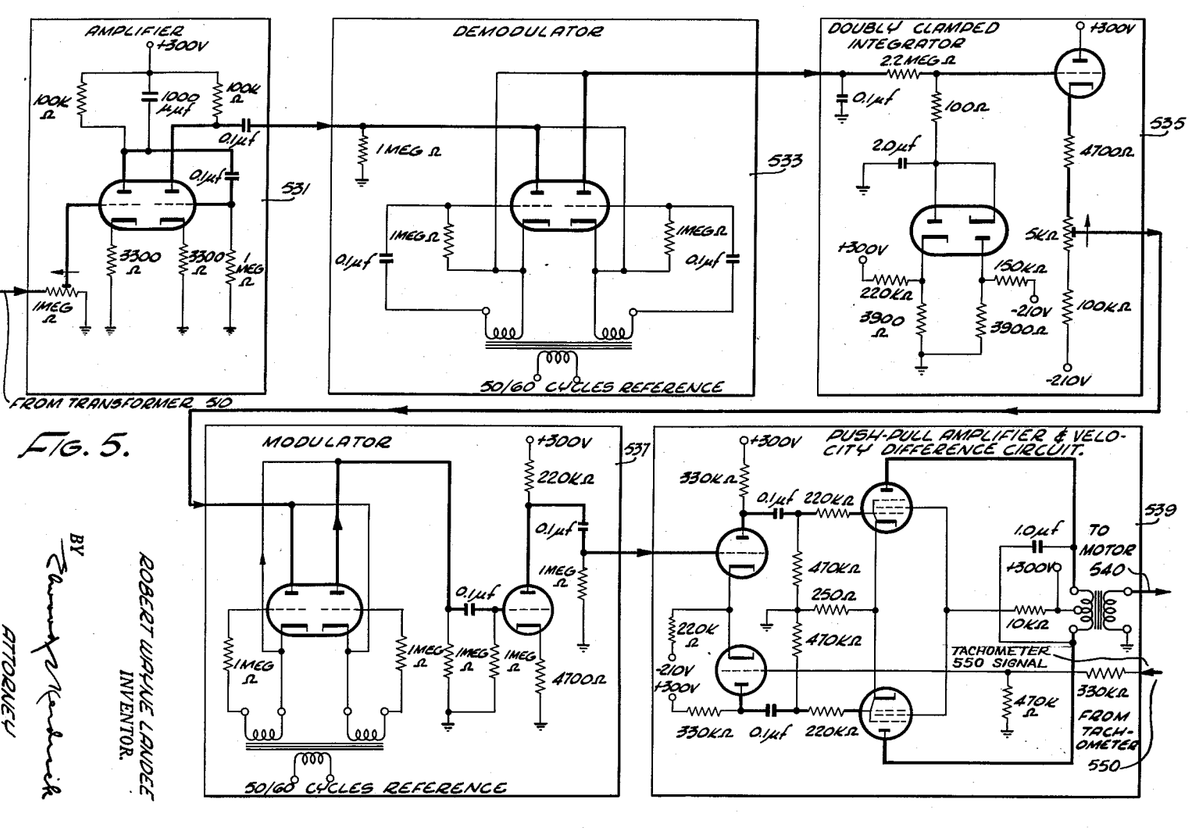
FIG. 5 is a schematic diagram of a suitable form of servo control circuit which may be utilized to control the movement of the deflection elements employed according to the present invention.

While servo control circuit 500, and specifically amplifier 530 therein, may assume a multitude of forms, a preferred arrangement is shown in FIG. 5. Referring now to FIG. 5, it is noted that an amplifier 531 receives an input signal derived through output winding 514 of transformer 510. This signal after amplification is applied to a demodulator 533 wherein a 50 or 60 cycle reference signal, constituting the synchro excitation signal source, is utilized to detect the signal amplitude of the received signal, resulting in an output signal having a corresponding level. This output signal is integrated in a doubly clamped integrator 535 to provide a faster response to signal changes and the integrated output thereof is then translated again to a modulated reference signal in a modulator 537. This modulated reference signal then controls a push-pull amplifier and velocity difference circuit 539 producing output signals which drive motor 540 shown in FIG. 1.

Push-pull amplifier circuit 539 also receives a signal from tachometer 550 representing the revolution rate of motor 540. This signal is an A.C. signal at the frequency of the synchro reference and is utilized to establish a velocity difference control. The output signal produced by amplifier 539 drives motor 540 at a varying rate until the signal received from transformer 510 is zero, at which time rotatable element 310 is positioned in accordance with the applied synchro signal.

From the foregoing description, it is apparent that the present invention provides a selectively operable indicating device for presenting either polar, rectilinear, or mixed polar rectilinear displays of target information without the necessity of duplication circuits. The invention is particularly adapted for utilization in a system where surveillance and precision scanning is to be performed and provides an efficient switching arrangement for controlling the operation of an indicating device to provide the required displays.

It has been shown that another important subcombinational aspect of the invention is the provision of means for controlling the position of a rotatable deflection element in a selectively operable manner where it may either be rotated in synchronism with a scanning device during searching operations or is positioned in a direction corresponding to one coordinate of an operation display.

While the invention is not so limited, its adaptation in a ground controlled approach radar system has been described. In this system elevation and azimuth scanning antennas are employed and in one utilization the azimuth antenna is rotated during surveillance or searching operations and a display device is synchronously controlled to provide a polar or P.P.I. display. In this system then the invention allows the utilization of the same circuits to provide, at the option of the operator, a precision display in elevation and azimuth where in a typical installation these displays may be "B" displays.

The economical application of the invention should now be recognized as readily adapted for use in small airport facilities.

An attempt has been made herein to summarize the inventive concepts and to avoid unnecessary reference to particular types of circuits or elements which should be employed. On the other hand, a complete disclosure has been made of preferred circuits which are particularly related to the inventive contribution. Reference is also made herein to certain copending applications wherein associated circuits are shown. However, it should be understood that while the circuits and elements shown are preferred in the particular practice of the invention, the concepts are by no means so limited and may be extended in a variety of ways, as will be readily understood by those skilled in the art.

What is claimed is:

1. In a ground-controlled approach radar system including a cathode-ray indicator, and an antenna rotatable continuously in one direction throughout more than 360° for surveillance and rotatable in a manner to oscillate back and forth through a predetermined angle of less than 360° for precision approach, the combination comprising: means including a rotatable member to deflect the cathode ray of said indicator radially in an angular direction representative of the angular position of said rotatable member; means for producing a varying signal changing in magnitude in accordance with the rotation of said antenna at least during surveillance; means for producing a constant signal of a fixed magnitude; and means for rotating said rotatable member to an angular position corresponding to the magnitude of each of said signals, selectively.

2. In a ground-controlled approach radar system including a cathode-ray indicator, and an antenna rotatable continuously in one direction throughout more than 360° for surveillance and rotatable in a manner to oscillate back and forth in a predetermined angle of less than 360° for precision approach, the combination comprising: means including a rotatable member to deflect the cathode ray of said indicator radially in an angular direction representative of the angular position of said rotatable member; means for producing a varying signal changing in magnitude in accordance with the rotation of said antenna at least during surveillance; means for producing a constant signal of a fixed magnitude; motive power means for rotating said rotatable member to an angular position corresponding to the magnitude of an input thereto; and means actuable to introduce one of said signals at a time to said motive power means as the input thereto.

3. In a ground-controlled approach radar system including a cathode-ray indicator, and an antenna rotatable continuously in one direction throughout more than 360° for surveillance and rotatable in a manner to oscillate back and forth through a predetermined angle of less than 360° for precision approach, the combination comprising: surveillance deflection means including a rotatable member to deflect the cathode ray of said indicator radially in an angular direction representative of the angular position of said rotatable member; means for producing a varying signal changing in magnitude in accordance with rotation of said antenna at least during surveillance; means for producing a constant signal of a fixed magnitude; motive power means for rotating said rotatable member to an angular position corresponding to the magnitude of an input thereto; means actuable to introduce one of said signals at a time to said motive power means as the input thereto; a pair of orthogonally disposed deflection means in addition to said surveillance deflection means to deflect the cathode ray of said indicator at right angles with respect to each other; and means selectively operable for impressing a set of centering control signals on said pair of deflection means during surveillance, and for impressing a set of deflection signals on said pair of deflection means during precision approach.

4. In a system where search and surveillance scanning is to be performed through the utilization of a rotatable scanning device at a transmitting location and precision scanning is to be performed through the oscillatory scanning of the device, the system including an indicator device at a receiving location having first, rotatable deflection means controllable in synchronism with the rotatable scanning device through the receiver section of a synchronizing means, the system also including a transmitter section of said synchronizing means at the transmitting location to provide rotation indicating signals, and including second deflection means in the indicator device providing deflection signals in predetermined coordinate directions; a switching arrangement comprising: first means associated with the input circuit of the receiver section of said synchronizing means selectively operable for presenting the rotation indicating signals to said receiver section during search and surveillance scanning and for presenting a fixed excitation signal to said receiver section during precision scanning, the vector direction of said excitation signal as presented to said receiver section being selected to control the position of said rotatable deflection means to a predetermined indicating direction; second means at the receiving location selectively operable to apply surveillance and precision sweep rate control signals to one of said deflection means; and third means at the receiving location selectively operable to apply surveillance and precision centering signals to said deflection means.

5. The switching arrangement defined in claim 4 wherein the rotatable scanning device is an azimuth antenna, said system further including an elevation antenna adapted to be cooperatively actuated with said azimuth antenna in oscillatory rotation during said precision scanning and a switch associated with said first means for presenting said excitation signal for remoting to the input circuit of said transmitter section during surveillance scanning; said first means including a switch for presenting azimuth antenna rotation indicating signals to said receiver section input circuit during surveillance scanning and for presenting said fixed excitation signal to said input circuit during precison scanning.

6. A selectively operable device actuable to provide polar sweep deflection signals or sweep deflection signals in a fixed coordinate direction, said device comprising: a rotatable deflection member; servo means associated with said member for controlling the position thereof in accordance with received position-indicating signals; a fixed deflection member including means providing substantially perpendicular deflection components; a first switching element for selectively applying rotation controlling signals to said servo means for actuating said device to provide the polar sweep deflection signals, and for applying fixed position-indicating signals for actuating said device to provide the deflection signals in a fixed coordinate direction; and a second switching element for applying centering control signals to said fixed deflection element during the provision of polar sweep deflection signals and for applying a variable deflection control signal in a direction other than said predetermined fixed coordinate, as well as a centering signal in the direction of said predetermined fixed coordinate.

7. The device defined in claim 6 wherein said rotatable deflection member is an air core magnetic yoke adapted to receive range sweep signals at a relatively high frequency for utilization in providing a PPI display; and wherein said fixed deflection member is a high permeability magnetic core yoke which may be utilized for slow speed deflections or static centering.

8. In an indicator system where polar and rectilinear displays are to be provided in response to surveillance and precision electrical control signals, respectively, a device for controlling the utilization of a rotatable deflection element in said indicator system, said device comprising: a servo control circuit coupled to said element for positioning the element in accordance with received position-indicating signals, said servo control circuit including a synchro having a plurality of windings; first switching means including a plurality of switching elements corresponding to said windings, respectively, for selectively applying rotating position signals to the windings of said servo circuit in response to said surveillance control signal; and second switching means including switching elements for selectively applying a fixed position indicating signal to the windings of said servo control circuit in response to said precision electrical control signal.

9. In a radar system including an azimuth antenna adapted for utilization in surveillance 360° scanning and including an elevation antenna, the azimuth and elevation antennas being adapted to scan in an oscillatory manner for precision scanning, an indicator circuit which may be selectively operated in response to surveillance and precision control signals, respectively, to provide a rotating range vector display and a fixed range vector display, said indicator circuit comprising: a rotatable deflection yoke suitable for providing relatively high frequency range deflection signals; a fixed deflection element adapted to provide rectilinear displacement signals which may vary at a relatively slow rate; control means for positioning said yoke in accordance with received direction signals; selectively operable first switching means for applying 360° scanning direction signals to said control means during surveillance and a fixed direction signal to said control means during precision scanning, said fixed direction corresponding to one coordinate in said precision display; and selectively operable second switching means for applying surveillance centering signals to said fixed deflection element during surveillance, and for applying azimuth and elevation position-indicating signals to said fixed element in one coordinate and a centering signal to said fixed element in the other coordinate.

10. The deflection circuit defined in claim 11 wherein fourth switching means is provided for applying deflection signals to said second deflection device.

11. A dual-purpose deflection circuit which may be utilized upon selection to provide range deflecting signals in a variable polar direction or range deflecting signals in a fixed coordinate direction, said deflection circuit comprising: a first, rotatable deflection device for receiving range-gated sweep control signals; a servo circuit coupled to said device for positioning said device in accordance with received position-indicating signals; first selectively operable switching means for presenting polar position-indicating signals to said servo circuit in accordance with the range direction required; a second deflection device adapted to provide deflection signals in a fixed coordinate direction; second selectively operable switching means for presenting a position-indicating signal in the fixed coordinate direction to said servo circuit; and means for applying a control signal to said selectively operable switching means to cause the presentation of the respective position-indicating signals.

12. The deflection circuit defined in claim 11 wherein a third switching means is included for providing centering signals for said polar display References Cited in the file of this patent

UNITED STATES PATENTS

| | | |
|---|---|---|
| 2,688,130 | Whitaker | Aug. 31, 1954 |
| 2,715,726 | Rychlik | Aug. 16, 1955 |
| 2,803,005 | Bartelink | Aug. 13, 1957 |
| 2,836,812 | Fyler | May 27, 1958 |

UNITED STATES PATENT OFFICE
CERTIFICATE OF CORRECTION

Patent No. 3,009,144                                           November 14, 1961

Robert Wayne Landee

It is hereby certified that error appears in the above numbered patent requiring correction and that the said Letters Patent should read as corrected below.

Column 14, line 21, the claim numbered "10" should be renumbered as claim -- 11 --; same line 21, for the claim reference numeral "11" read -- 10 --; line 24, the claim numbered "11" should be renumbered as claim -- 10 --; same column 14, line 43, for the claim reference numeral "11" read -- 10 --.

Signed and sealed this 19th day of June 1962.

(SEAL)
Attest:

ERNEST W. SWIDER                                         DAVID L. LADD
Attesting Officer                                         Commissioner of Patents

UNITED STATES PATENT OFFICE
CERTIFICATE OF CORRECTION

Patent No. 3,009,144                          November 14, 1961

Robert Wayne Landee

It is hereby certified that error appears in the above numbered patent requiring correction and that the said Letters Patent should read as corrected below.

Column 14, line 21, the claim numbered "10" should be renumbered as claim -- 11 --; same line 21, for the claim reference numeral "11" read -- 10 --; line 24, the claim numbered "11" should be renumbered as claim -- 10 --; same column 14, line 43, for the claim reference numeral "11" read -- 10 --.

Signed and sealed this 19th day of June 1962.

(SEAL)
Attest:

ERNEST W. SWIDER
Attesting Officer

DAVID L. LADD
Commissioner of Patents